United States Patent
Porras et al.

(10) Patent No.: US 7,143,444 B2
(45) Date of Patent: Nov. 28, 2006

(54) APPLICATION-LAYER ANOMALY AND MISUSE DETECTION

(75) Inventors: Phillip Andrew Porras, Cupertino, CA (US); Magnus Almgren, Mountain View, CA (US); Ulf E. Lindqvist, Mountain View, CA (US); Steven Mark Dawson, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 923 days.

(21) Appl. No.: 09/996,154

(22) Filed: Nov. 28, 2001

(65) Prior Publication Data

US 2003/0101358 A1 May 29, 2003

(51) Int. Cl.
*G06F 9/00* (2006.01)
(52) U.S. Cl. .............. 726/30; 726/25; 726/24; 726/11; 726/4
(58) Field of Classification Search .......... 726/23, 726/25, 26, 30, 29, 28, 27, 24, 11, 5
See application file for complete search history.

(56) References Cited

U.S. PATENT DOCUMENTS

| 5,440,723 | A |   | 8/1995  | Arnold et al. ........... 395/181 |
|-----------|---|---|---------|-----------------------------------|
| 5,557,742 | A | * | 9/1996  | Smaha et al. ................ 726/22 |
| 5,748,098 | A |   | 5/1998  | Grace ................... 380/825.76 |
| 6,275,942 | B1 | * | 8/2001  | Bernhard et al. ............ 726/22 |
| 6,477,651 | B1 | * | 11/2002 | Teal ............................ 726/23 |
| 6,546,493 | B1 | * | 4/2003  | Magdych et al. ............ 726/25 |
| 6,553,378 | B1 | * | 4/2003  | Eschelbeck ................. 707/10 |
| 6,681,331 | B1 | * | 1/2004  | Munson et al. ............. 726/23 |
| 6,704,874 | B1 | * | 3/2004  | Porras et al. ............... 726/22 |
| 6,826,697 | B1 | * | 11/2004 | Moran ....................... 726/23 |
| 6,839,850 | B1 | * | 1/2005  | Campbell et al. ............ 726/23 |
| 6,947,726 | B1 | * | 9/2005  | Rockwell ................... 455/411 |
| 7,017,185 | B1 | * | 3/2006  | Wiley et al. ................. 726/23 |
| 7,017,186 | B1 | * | 3/2006  | Day ............................ 726/23 |
| 7,028,228 | B1 | * | 4/2006  | Lovy et al. .................. 714/57 |
| 2003/0145226 | A1 |   | 7/2003  | Bruton, III et al. ......... 713/201 |
| 2003/0172166 | A1 |   | 9/2003  | Judge et al. ................ 709/229 |

FOREIGN PATENT DOCUMENTS

WO        03/077071        9/2003

OTHER PUBLICATIONS

Almgren, et al., "A Lightweight Tool for Detecting Web Server Attacks," Network and Distributed Systems Security (NDSS 2000) Symposium Proceedings, 157-170, 2000.

Almgren, et al., "Application-Integrated Data Collection for Security Monitoring," From *Recent Advances in Intrusion Detection (RAID 2001)*, Springer, Davis, California, Oct. 2001, p. 22-36.

Daniels, et al., "A Network Audit System for Host-Based Intrusion Detection (NASHID) in Linux," 16th Annual Computer Security Application Conference (ACSAC'00) Dec. 11-15, 2000, New Orleans, LA.

(Continued)

*Primary Examiner*—Norman M. Wright
(74) *Attorney, Agent, or Firm*—Kin-Wah Tong, Esq.; Patterson & Sheridan, LLP

(57) ABSTRACT

A method includes passing a request for data received by a first server process executing in a first server to a detection process that includes packing a subset of the data into an analysis format and passing the subset to an analysis process.

21 Claims, 5 Drawing Sheets

OTHER PUBLICATIONS

Daniels, "Identification of Host Audit Data to Detect Attacks on Low-Level IP Vulnerabilities," J. Computer Security, 7(1): 3-35, 1999.

Dayioglu, "APACHE Intrusion Detection Module," http://yunus.hacettepe.edu.tr/~burak/mod_id/, Date Unknown, Downloaded Nov. 10, 2003.

Hollander, Y., "The Future of Web Server Security: Why your Web site is still vulnerable to attack," http://www.cgisecurity.com/lib/wpfuture.pdf, allegedly posted 2000.

Lindqvist, et al., "eXpert-BSM: A Host-based Intrusion Detection Solution for Sun Solaris," Proc. 17th Annual Computer Security Application Conference, p. 240-251, New Orleans, LA, Dec. 10-14, 2001.

Munson, et al., "Watcher: The Missing Piece of the Security Puzzle," Proceedings of the 17th Annual Computer Security Applications Conference (ACSAC'01), Dec. 10-14, 2001, New Orleans, LA, pp. 230-239, IEEE Press.

Porras et al, "EMERALD: Event Monitoring Enabling Responses to Anomalous Live Disturbances," 20th NISSC—Oct. 9, 1997, p. 353-365.

Tener, "AI and 4GL: Automated Detection and Investigation Tools", Proceedings of the IFIP Sec. '88, Australia, 1989, pp. 23-29.

* cited by examiner

APPLICATION-LAYER ANOMALY AND MISUSE DETECTION

REFERENCE TO GOVERNMENT FUNDING

This invention was made with Government support under Contract Numbers F30602-98-C-0059 and F30602-99-C-0149, both contract awarded by DARPA. The Government has certain rights in this invention.

TECHNICAL FIELD

This invention relates to application-layer anomaly and misuse detection.

BACKGROUND

Intrusion detection is a type of security management system for computers and networks. An intrusion detection system (IDS) gathers and analyzes information from various areas within a computer or a network to identify possible security breaches, which include both intrusions (attacks from outside the organization) and misuse (attacks from within the organization). Intrusion detection typically uses vulnerability assessment (sometimes referred to as scanning), which is a technology developed to assess the security of a computer system or network. Intrusion detection functions include: monitoring and analyzing both user and system activities; analyzing system configurations and vulnerabilities; assessing system and file integrity; ability to recognize patterns typical of attacks; analysis of abnormal activity patterns; and tracking user policy violations.

SUMMARY

In an aspect, the invention features a method including in a server, hosting an intrusion detection process that provides intrusion detection services and integrating the intrusion detection process with a server process.

Embodiments may have one or more of the following. Integrating may include defining global application programmer interface (API) structures in the intrusion detection process to establish a connection to an application programmer interface (API) of the server process.

The method may also include passing a request for data received by the server to the intrusion detection process.

The intrusion detection process may include packing a subset of the data into an analysis format and passing the subset to an analysis process. The method may also include analyzing the subset in the analysis process. The server may be a web server such as an Apache web server.

The analysis process may reside in the web server or outside of the web server.

Passing may also include delivering the subset in a funneling process via a socket. The funneling process may include accepting incoming connections to which the subset can be transmitting and passing the subset to outgoing connections.

In another aspect, the invention features a method including passing a request for data received by a first server process executing in a first server to a detection process that includes packing a subset of the data into an analysis format and passing the subset to an analysis process.

Embodiments may include one or more of the following. The method may further include analyzing the subset in the analysis process.

Passing may include passing control from the first server through an Application Programming Interface (API) of the first server program. The first server may be a web server. The detection process may reside in the first server. The analysis process may reside in the first server or in a second server.

The analysis format may be an Emerald format and the analysis process may be an Emerald expert analysis process.

The web server may be an Apache web server.

Passing may further include receiving the subset in a piped logs interface of the Apache web server and delivering the subset to a funneling process via a socket.

The funneling process may include accepting incoming connections to which the subset can be transmitted and passing the subset to outgoing connections. The funneling process may further include duplicating the subset for delivery to a second analysis process.

In another aspect, a system includes a web server process having an application programming interface (API) and an intrusion detection process linked to the API.

Embodiments may include one or more of the following. The system may include a link to an external system having an analysis process.

The intrusion detection process may include receiving a request for data, packing a subset of the data into a common analysis format, passing the subset to the analysis process, and analyzing the subset in the analysis process.

The web server process may be an Apache web server process.

The common analysis format may be an Emerald format and the analysis process may be an Emerald analysis process.

Embodiments of the invention may have one or more of the following advantages.

Being part of the application, the application-integrated intrusion detection process can access local variables that are never written to a log file, including intermediate results when interpreting requests.

The Application-integrated intrusion detection process can monitor how long it takes to execute a request, and detect possible denial-of-service (DoS) attacks.

In a Web server, the Application-integrated intrusion detection process can see an entire server request, including headers. The Application-integrated intrusion detection process knows which file within the local file system the request was mapped to, and even without parsing the configuration file of the Web server, the it can determine if this program will be handled as a CGI script.

The Application-integrated intrusion detection process generates fewer false alarms, as it does not have to guess the interpretation and outcomes of malicious requests.

The Application-integrated intrusion detection process is not hampered by encryption since it has access to the de-crypted data from the application.

Network speed is not an issue since the Application-integrated intrusion detection process is part of the application and takes part in the normal cycle when analyzing requests. Thus, the limiting factor is the application speed rather than the network speed.

The Application-integrated intrusion detection process may be pre-emptive. By being part of the application, the Application-integrated intrusion detection process supervises all steps of the request handling cycle and can react at any time.

In the context of HTTP traffic, a session is defined as a single transaction including a request and a response. As the Application-integrated intrusion detection process is part of the application, it automatically gets information about sessions.

Other features and advantages of the invention will be apparent from the description and drawings, and from the claims.

DETAILED DESCRIPTION

Figure 1:
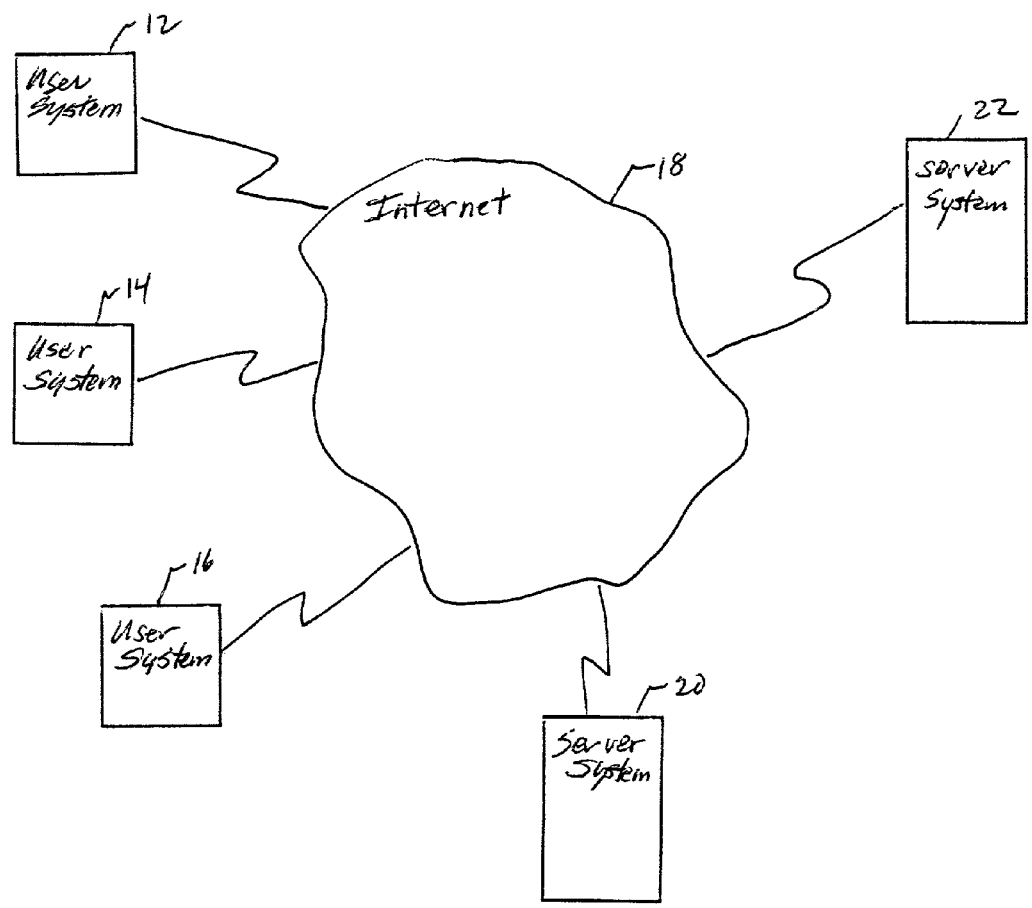
FIG. 1 shows an intrusion detection network.

Referring to FIG. 1, an intrusion detection network 10 includes user systems 12, 14 and 16. Each of the user systems 12, 14 and 16 is connected to a network of computers such as the Internet 18. A server system 20 and 22 are linked to the Internet 18. An example server system is a web server such as an Apache web server (see www. apache.org). In general, the servers 20 and 22 each execute a computer program that provides services to other computer programs in the same or other computers, such as user systems 12, 14 and 16. In a client/server programming model, each of the server systems 20 and 22 executes a program that awaits and fulfills requests from client programs in the same or other computers, such as the user systems 12, 14 and 16. Fulfillment of a request is generally referred to as a response.

In the World Wide Web ("Web"), servers 20 and 22 are referred to as Web servers. The Web server uses the client/server model and the Web's Hypertext Transfer Protocol (HTTP) to serve files that form Web pages to Web users on user systems 12, 14 and 16. Those user systems 12, 14 and 16 contain HTTP clients that forward the requests to the servers. Popular Web servers are, for example, Microsoft's Internet Information Server (IIS), which comes with the Windows NT server; Netscape FastTrack and Enterprise servers; and Apache, a Web server for UNIX-based operating systems. Other example Web servers include Novell's Web Server for users of its NetWare operating system, and IBM's family of Lotus Domino servers.

In the case of an Apache Web server, the Web server program is Apache web server software. Apache web server software is a freely available Web server computer program that is distributed under an "open source" license. For example, Version 2.0 runs on most UNIX-based operating systems (such as Linux, Solaris, Digital UNIX, and AIX), on other UNIX/POSIX-derived systems (such as Rhapsody, BeOS, and BS2000/OSD), on AmigaOS, and on Windows 2000 from Microsoft.

Figure 2:
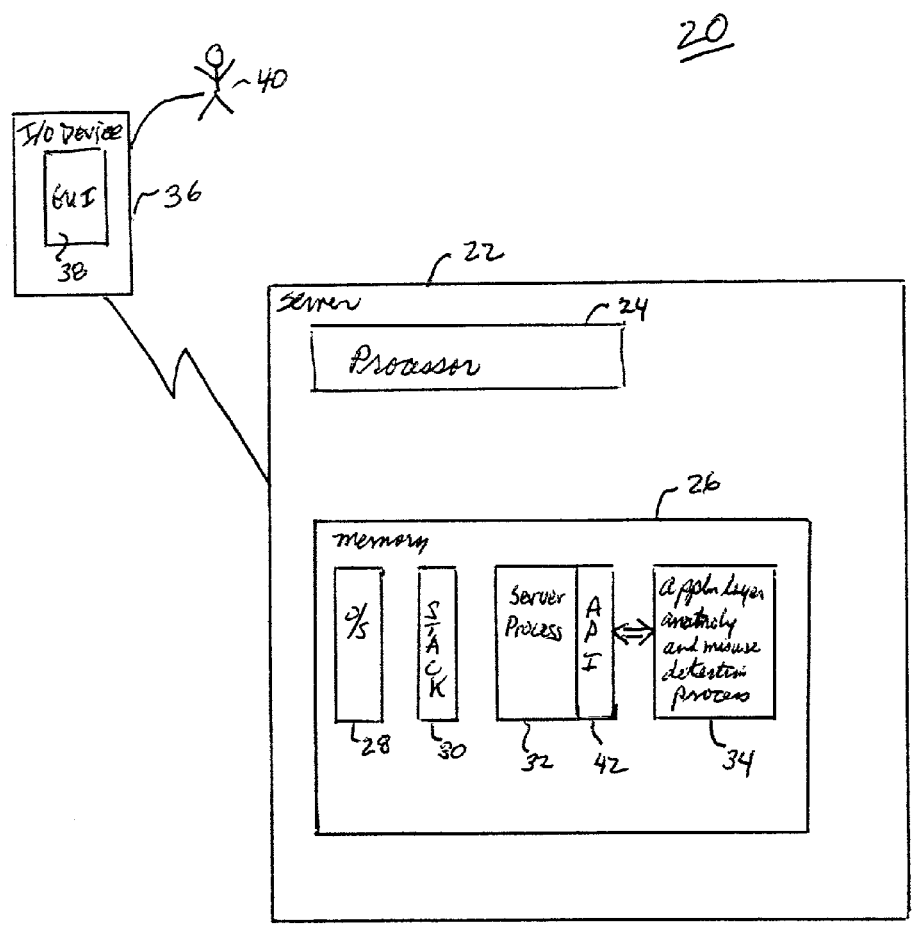
FIG. 2 shows the server system of FIG. 1.

Referring to FIG. 2, and using an Apache Web server as an example, the server system 20 includes a computer 22. The computer 22 is linked to the Internet 18 using TCP/IP (Transmission Control Protocol/Internet Protocol) or another suitable protocol. Computer 22 contains a processor 24 and a memory 26. Memory 26 stores an operating system ("OS") 28, a TCP/IP protocol stack 30 for communicating over network 18, machine-executable instructions executed by processor 24 to perform the Apache web server process 32, and machine-executable instructions to perform an application-integrated intrusion detection process 34. Computer 22 may also include an input/output (I/O) device 36 for display of a graphical user interface (GUI) 38 to a user 40.

The Apache web server process 32 includes an API (application programmer interface) 42. In general, an API is a specific method prescribed for one application program by which a programmer writing another application program can make requests of the application having the API. Specifically, the Apache API 42 allows third-party programmers to add new Apache web server functionality. The application-integrated intrusion detection process 34 utilizes the Apache API 42. As is described below, using the Apache API 42 the application-integrated intrusion detection process 34 integrates intrusion detection at the application layer, e.g., with the web server process 32. Being part of the web server application process provides the application intrusion detection process 34 access local variables that are never written to by a log file, including intermediate results when interpreting results. Further, process 32 can monitor how long at takes to execute a request and detect possible Denial-of-Service (DOS) attacks.

Figure 3:
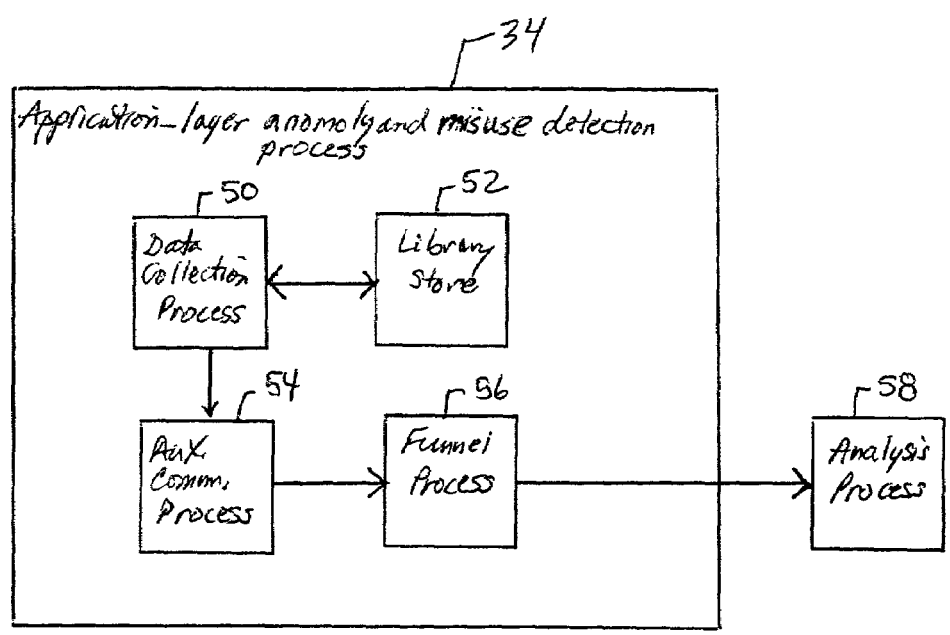
FIG. 3 shows the application-integrated intrusion detection process of FIG. 2.

Referring now to FIG. 3, the application-integrated intrusion detection process 34 is integrated to the web server process 32 and includes a data collection process 50 that interfaces with the Apache API 42 of the web server process 32 and an internal library store 52. The data collection process 50 feeds an auxiliary communication process 52, which is linked to a funneling process 56. The funneling process 56 is linked to an analysis engine 58.

In operation, the web server process 32 passes control through the API 42 to the data collection process 50 of the application-integrated intrusion detection process 34 in a logging phase (90 of FIG. 4 below) of an Apache request processing loop. Apache breaks down request handling into a set of phases, which are executed successively for each incoming request. A module can choose to handle any of these phases. When one writes a module for the Apache web server, one defines global API structures in source code that establish a connection to the server code during linking, thus integrating the module with the web server process. In these structures one can define configuration directives, which can be used in a configuration file of the server to customize the module, and a handler function for each phase (also called hooks) of the request processing.

Apache phases are handled by looking at each of a succession of modules, looking to see if each of them has a handler for the phase, and attempting invoking it if so. The handler can typically do one of three things: handle the request, and indicate that it has done so by returning the magic constant OK; decline to handle the request, by returning the magic integer constant DECLINED. In this case, the server behaves in all respects as if the handler simply hadn't been there; or signal an error, by returning one of the HTTP error codes. This terminates normal handling of the request, although an ErrorDocument may be invoked to try to mop up, and it will be logged in any case.

Most phases are terminated by the first module that handles them; however, for logging, 'fixups', and non-access authentication checking, all handlers always run (barring an error). Also, a response phase is unique in that modules may declare multiple handlers for it, via a dispatch table keyed on the MIME type of the requested object. Modules may declare a response-phase handler that can handle any request, by giving it the key */* (i.e., a wildcard MIME type specification). However, wildcard handlers are only invoked if the server has already tried and failed to find a more specific response handler for the MIME type of the requested object (either none existed, or they all declined).

At this point, we need to explain the structure of a module. A CGI module is one example module. The Common Gateway Interface (CGI) is a standard way for a Web server to pass a Web user's request to an application program and to receive data back to forward to the user. When the user requests a Web page (for example, by clicking on a highlighted word or entering a Web site address), the server sends back the requested page. However, when a user fills out a form on a Web page and sends it in, it usually needs to be processed by an application program. The Web server typically passes the form information to a small application program that processes the data and may send back a confirmation message. This method or convention for passing data back and forth between the server and the application is called the Common Gateway Interface (CGI). It is part of the Web's Hypertext Transfer Protocol (HTTP).

The CGI module handles both CGI scripts and the ScriptAlias config file command. It's actually a great deal more complicated than most modules, but if we're going to have only one example, it might as well be the one with its fingers in every place.

Let's begin with handlers. In order to handle the CGI scripts, the module declares a response handler for them. Because of ScriptAlias, it also has handlers for the name translation phase (to recognize ScriptAliased URIs), the type-checking phase (any ScriptAliased request is typed as a CGI script).

The module needs to maintain some per (virtual) server information, namely, the ScriptAliases in effect; the module structure therefore contains pointers to a functions which builds these structures, and to another which combines two of them (in case the main server and a virtual server both have ScriptAliases declared).

Finally, this module contains code to handle the ScriptAlias command itself. This particular module only declares one command, but there could be more, so modules have command tables that declare their commands, and describe where they are permitted, and how they are to be invoked.

A final note on the declared types of the arguments of some of these commands: a pool is a pointer to a resource pool structure; these are used by the server to keep track of the memory which has been allocated, files opened, etc., either to service a particular request, or to handle the process of configuring itself. That way, when the request is over (or, for the configuration pool, when the server is restarting), the memory can be freed, and the files closed, en masse, without anyone having to write explicit code to track them all down and dispose of them. Also, a cmd_parms structure contains various information about the config file being read, and other status information, which is sometimes of use to the function which processes a config-file command (such as ScriptAlias). With no further ado, the module itself:

```
/* Declarations of handlers. */
int translate_scriptalias (request_rec *);
int type_scriptalias (request_rec *);
int cgi_handler (request_rec *);
/* Subsidiary dispatch table for response-phase handlers,
by MIME type */
handler_rec cgi_handlers [ ] = {
{ "application/x-httpd-cgi", cgi_handler },
{ NULL }
};
/* Declarations of routines to manipulate the module's
configuration
    * info. Note that these are returned, and passed in, as
void *'s;
```

```
    * the server core keeps track of them, but it doesn't, and
can't,
    * know their internal structure.
    */
void *make_cgi_server_config (pool *);
void *merge_cgi_server_config (pool *, void *, void *);
/* Declarations of routines to handle config_file commands
*/
extern char *script_alias (cmd_parms *, void
*per_dir_config, char *fake,char *real);
    command_rec cgi_cmds[ ] = {
    { "ScriptAlias", script_alias, NULL, RSRC_CONF, TAKE2,
    "a fakename and a realname"},
    { NULL }
    };
    module cgi_module = {
    STANDARD_MODULE_STUFF,
    NULL,                    /* initializer */
    NULL,                    /* dir config creator */
    NULL,                    /* dir merger --- default is
to override */
    make_cgi_server_config,  /* server config */
    merge_cgi_server_config, /* merge server config */
    cgi_cmds,                /* command table */
    cgi_handlers,            /* handlers */
    translate_scriptalias,   /* filename translation */
    NULL,                    /* check_user_id */
    NULL,                    /* check auth */
    NULL,                    /* check access */
    type_scriptalias,        /* type_checker */
    NULL,                    /* fixups */
    NULL,                    /* logger */
    NULL                     /* header parser */
    };
```

The sole argument to handlers is a request$_{13}$ rec structure. This structure describes a particular request that has been made to the server, on behalf of a client. In most cases, each connection to the client generates only one request_rec structure.

Figure 4:
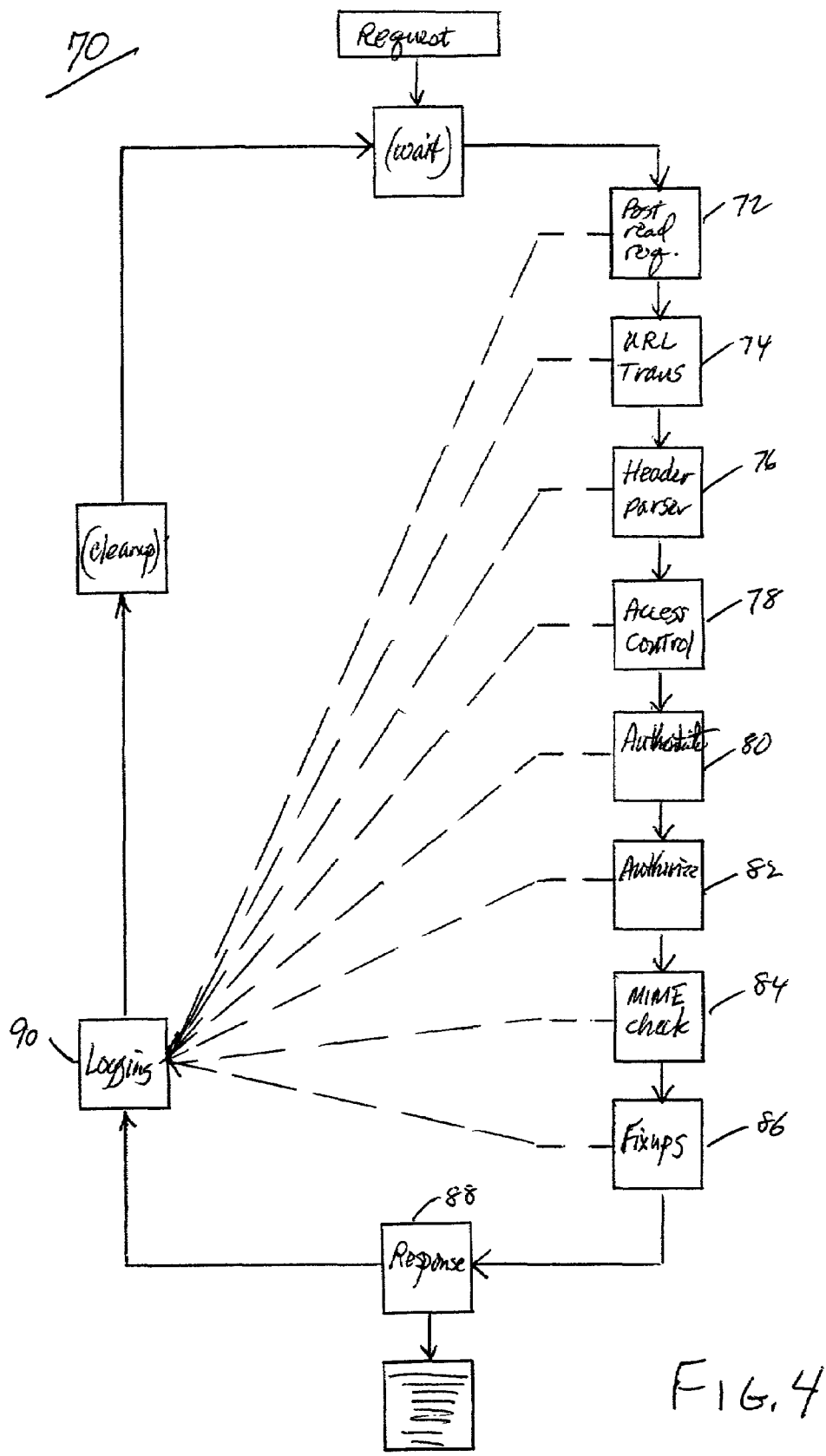
FIG. 4 shows a flow diagram of a request processing loop of an Apache web server.

Referring to FIG. 4, an Apache request processing loop 70 is shown. A main transaction path is shown as a solid line while a path taken when a handler returns an error is shown with dashed lines. The request processing loop 70 is divided into ten phases. If no handler is registered for a phase or every handler declines the request, a default handler in the server core is called.

In a post-read-request phase 72, handlers get called before actual processing of the request starts. A proxy module for example uses this hook to identify proxy requests and to prevent other modules from processing it. In a URL translation phase 74 the file or script is determined to which the current request refers. In a header parser phase 76 the HTTP header information is parsed and stored in the internal data structures to make them available to the following phases.

In an access control phase 78, a module can check if the client is allowed to access the requested document. In an authentication phase 80, if an authentication is necessary for the requested document, a module can ask for user name and password in this phase.

In an authorization phase 82, if an authentication has been performed, a module can check if it was valid. In a MIME-type-checking phase 84 a preliminary guess of the requested document's MIME type is determined. The decision may be based on the document's file extension, the name of its file, or the document's location in the document tree. A fixups phase 86 may, for example, be used to generate additional HTTP header lines for the response. In a response phase 88, the response handler (content handler) may adjust the HTTP response header and the MIME type to suit its needs and will provide the data that is sent to the client. In a logging phase 90, the processed request is logged.

Referring again to FIG. 3, the data collection process 50 takes relevant data of the request and packs it into a format that the analysis engine 58 can understand.

Being integrated with the web server process 32, relevant data may include local variables that are never written to a log file, including intermediate results when interpreting requests. It may also include how long it takes to execute a request and detect possible denial-of-service (DoS) attacks. Relevant data may also include data involving the entire request, including headers. For example, relevant data may identify the file within the local file system that the request is mapped to and may include a determination whether the program will be handled as a CGI (common gateway interface).

The common format may be an Emerald format as designed by SRI International, Inc. of Palo Alto, Calif., and incorporated by reference herein (see www.sri.com).

An exemplary Emerald input record format is:

```
ptype[bsm_event
    human_time:          string,   'Header timestamp as a string.
    header_event_type:   int,      'Header event numerical ID
    header_time:         int,      'Header time as a numeric value.
    header_command:      string,   'Header event ID as a string
                                    (event name)
    header_size:         int,      'Header byte count
    msequenceNumber:     int,      'Sequence token number
    path_List:           string,   'Paths from one or several path
                                    tokens
    subject_auid:        int,      'Subject audit ID
    subject_euid:        int,      'Subject effective user ID
    subject_ruid:        int,      'Subject real user ID
    subject_pid:         int,      'Subject process ID
    subject_sid:         int,      'Subject audit session ID
    subject_machine_ID:  string,   'Subject machine ID
    in_addr_address:     string,   'In_addr Internet address
    in_addr_hostname:    string,   'In_addr Internet hostname
    attr_uidList:        int,      'Attribute owner UID
    val_List:            int,      'Argument value
    return_return_value: int,      'Return process value
    return_error_number: int,      'Return process error
    textList:            string,   'Text strings from one or several
                                    text tokens
    exec_args:           string,   'Exec arguments
    exec_env_txt:        string,   'Exec environment
    sock1_sock_type:     int,      'Socket type
    sock1_remote_port:   int,      'Socket remote port
    sock1_remote_iaddr:  string,   'Socket remote IP address
    sock1_local_port:    int,      'Socket local port
    sock1_local_iaddr:   string,   'Socket local IP address
    sock2_sock_type:     int,      'Socket type for second socket
                                    token
    sock2_remote_port:   int,      'Socket remote port for second
                                    socket token
    synthetic_parentCMD: string,   'Synthetic parent command
    synthetic_parentIP:  string,   'Synthetic parent IP address
]
```

More specifically, the above format represents a Solaris BSM EMERALD template used to drive an eXpert-BSM analysis. These fields represent a subset of the available fields produced in the Solaris BSM audit record structure. Before analyzing audit records, eXpert-BSM's event preprocessing service, ebsmgen, first transforms the content of each audit record into an internal message structure. These messages include two important synthetic fields, called synthetic_parentCmd and synthetic_parentIP. Although audit records provide detailed information regarding each system call, they do not identify the command (process image name) under which the system call was invoked. The synthetic_parentcmd field tracks this important attribute by observing exec calls. Second, although Solaris audit records are structured to include information regarding source IP information for transactions not performed from the console, this information is unreliable across audit event types and OS versions. By tracking the source IP information and always reporting it in synthetic_parentIP, ebsmgen provides consistently correct IP information for all audit records.

The following represents an example BSM EMERALD Transaction.

Message v0.0i ID 2 #9680 @ 2000-01-14 16:21:49.430491 UTC (396bytes) fields:
04:|file.file_index=1 (0x1)""
05:|header.size=219 (0xdb)
06:|header.event_type=23 (0x17)
07:|header.event_modifier=0 (0x0)
08:|header.seconds_of_time=947866909 (0x387f4d1d)
09:|header.milliseconds_of_time=430492888 (0x19a8ccd8)
10:|header.command=execve(2)
11:|header.time=2000-01-14 16:21:49.430491 UTC
34:|path.count=2(0x2)
35:|path.pathList=[/usr/sbin/in.ftpd/usr/lib/ld.so.1]
51:|return.error_number=0 (0x0)""
52:|return.return_value=0 (0x0)
53:|subject.auid=0 (0x0)
54:|subject.euid=0 (0x0)
55:|subject.egid=0 (0x0)
56:|subject.ruid=0 (0x0)
57:|subject.rgid=0 (0x0)
58:|subject.pid=29205 (2x7215)
59:|subject.sid=0 (0x0)
73:|attribute.modeList=[33133 33261]
74:|attribute.uidList=[2 2]
75:|attribute.gidList=[2 2]
76:|attribute.file_system_idList=[8388614 8388614]
77:|attribute.node_idList=[306304 11861]
78:|attribute.deviceList=[0 0]
95:|exec_args.count=1 (0x1)
96:|exec_args.text=[ in.ftpd]
97:|exec_env.count=2 (0x2)
98:|exec_env.text=[PATH=/usr/sbin:/usr/bin    TZ=US/Pacific]
117:|synthetic.parentCmd=/usr/sbin/in.ftpd
118:|synthetic.parentIPAddr=109.09.99.9

Specifically, the above format illustrates an example in etd exec syscall record, which is initiating the FTP daemon. Each message is passed on from the preprocessor to the event handling interface of the expert system, where it is asserted as a fact according to a fact type definition known as a ptype in P-BEST.

An Emerald (Event Monitoring Enabling Responses to Anomalous Live Disturbances) environment is a distributed scalable tool suite for tracking malicious activity. Emerald is a highly distributed, building-block approach to network surveillance, attack isolation, and automated response. The approach uses highly distributed, independently tunable, surveillance and response monitors that are deployable polymorphically at various abstract layers in a large network. These monitors contribute to a streamlined event-analysis system that combines signature analysis with statistical profiling to provide localized real-time protection of the most widely used network services on the Internet.

Referring again to FIG. 3, through a reliable piped logs interface of Apache, the packed and formatted data is passed to the auxiliary communications process 54. The auxiliary communications process 54 hands the packed and formatted data to the funneling process 56 through a socket. Apache can be configured to generate logs in any format. In addition, on most Unix architectures, Apache can send log files to a pipe, allowing for log rotation, hit filtering, real-time splitting of multiple virtual hosts (vhosts) into separate logs, and asynchronous DNS resolving on the fly. The Apache reliable log interface sends the log information directly to a program. The term "reliable" signifies that Apache does some checking on the opened channel, such as making sure the connection is still accepting data.

The funneling process 56 communicates with the analysis engine 58 that is typically located in an external host and not in the web server 20. The funneling process 56, in an Emerald framework, accepts incoming connections where Emerald messages can be transmitted, and passes the information to outgoing connections. The funneling process 56 can duplicate incoming information (having two different analysis engines for the same application) or multiplex several incoming flows into one outgoing connection (comparing the results of a network-based monitor with an application integrated module for discrepancies). The funneling process 56 takes into account problems that might appear in interprocess communication, such as lost connections or necessary buffering. An example analysis engine 58 is the Emerald expert from SRI International, Inc., incorporated by reference herein (see www.sri.com). The Emerald expert analysis engine is a highly targetable signature-analysis engine based on the expert system shell P-BEST (Production-Based Expert System Toolset). Under Emerald's expert architecture, event-stream-specific rule set are encapsulated within resource objects that are then instantiated within an Emerald monitor. The objects can then be distributed to an appropriate observation point in the computing environment. This enables a spectrum of configurations from lightweight distributed expert signature engines to heavy-duty centralized host-layer expert engines, such as those constructed for use in expert's predecessors, NIDES (Next-Generation Intrusion Detection Expert System), and MIDAS (Multics Intrusion Detection Alerting System). In a given environment, P-BEST-based experts may be independently distributed to analyze the activity of multiple network services (e.g., FTP, SMTP, HTTP) or network elements (e.g., a router or firewall). As each Emerald expert is deployed to its target, it is instantiated with an appropriate resource object (e.g., an FTP resource object for FTP monitoring), while the expert code base remains independent of the analysis target.

Figure 5:
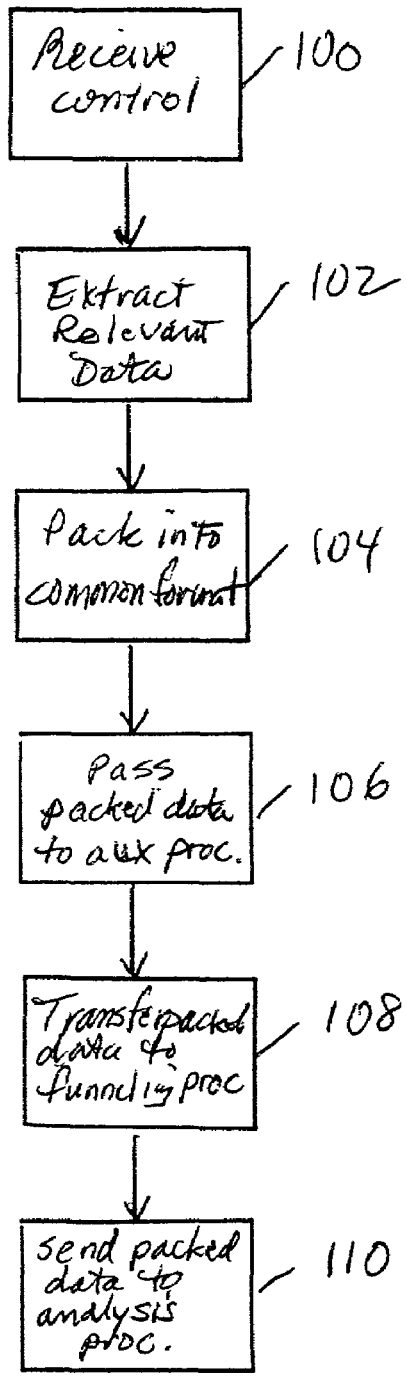
FIG. 5 is a flow diagram of the application-integrated intrusion detection process.

Referring to FIG. 5, the application-integrated intrusion detection process 34 includes receiving (100) control in a logging stage of a request cycle from a web server process. The process 34 extracts (102) relevant data of a request and packs (104) the relevant data in a common format. The process 34 passes (106) the packed data to an auxiliary process. The process 34 transfers (108) the packed data from the auxiliary process to a funneling process. The process 34 sends (110) the packed data from the funneling process to an analysis process.

A number of embodiments of the invention have been described. Nevertheless, it will be understood that various modifications may be made without departing from the spirit and scope of the invention. For example, the analysis process may reside within the first server. In other embodiments, the funneling process may replicate the subset and pass the replicated subsets to multiple analysis processes located at diverse positions throughout a network. Accordingly, other embodiments are within the scope of the following claims.

What is claimed is:

1. A method comprising:
   in a server, hosting an intrusion detection process that provides intrusion detection services;
   integrating the intrusion detection process with a server process; and
   passing a request for data received by the server process to the intrusion detection process,
   where the intrusion detection process comprises:
      packing a subset of information from the request into an analysis format; and
      delivering the subset in a funneling process, via a socket, to an analysis process.

2. The method of claim 1 in which integrating comprises:
   defining global application programmer interface (API) structures in the intrusion detection process to establish a connection to an application programmer interface (API) of the server process.

3. The method of claim 1 further comprising analyzing the subset In the analysis process.

4. The method of claim 1 in which the server is a web server.

5. The method of claim 1 in which the analysis process is resident in the server.

6. The method of claim 1 in which the analysis process is resident outside of the server.

7. The method of claim 1 in which the funneling process comprises:
   accepting incoming connections to which the subset can be transmitted; and
   passing the subset to outgoing connections.

8. The method of claim 1 in which the funneling process further comprises duplicating the subset for delivery to a second analysis process.

9. A method comprising:
   conveying a request for data received by a web server process executing in a first server to a detection process that includes:
      packing a subset of information from the request into an analysis format; and
      passing the subset to an analysis process, where passing comprises:
         receiving the subset in a piped logs interface of the web server; and
         delivering the subset to a funneling process via a socket.

10. The method of claim 9 also including analyzing the subset in the analysis process.

11. The method of claim 10 in which the analysis process is resident in the first server.

12. The method of claim 10 in which the analysis process is resident in a second server.

13. The method of claim 9 in which the detection process is resident in the first server.

14. The method of claim 9 in which the funneling process comprises:
   accepting incoming connections to which the subset can be transmitted; and
   passing the subset to outgoing connections.

15. The method of claim 9 in which the funneling process further comprises duplicating the subset for delivery to a second analysis process.

16. A computer program product residing on a computer readable medium having instructions stored thereon which, when executed by a processor, cause the processor to:
   host, in a server, an intrusion detection process that provides intrusion detection services;

integrate the intrusion detection process with a server process; and pass a request for data received by the server process to the intrusion detection process, where the intrusion detection process comprises:

packing a subset of information from the request into an analysis format; and delivering the subset in a funneling process, via a socket, to an analysis process.

17. A computer program product residing on a computer readable medium having instructions stored thereon which, when executed by a processor, cause the processor to:

convey a request for data received by a web server process executing in a first server to a detection process that includes:

pack a subset of information from the request into an analysis format; and pass the subset to an analysis process, where passing comprises:

receiving the subset in a piped logs interface of the web server; and delivering the subset to a funneling process via a socket.

18. A method for detecting misuse of an application server process that is hosted at a server in a network, the method comprising:

receiving, from the application server process, a forwarded request for data;

packing a subset of information from the request into an analysis format; and delivering the subset in a funneling process, via a socket, to an analysis process.

19. The method of claim 18, wherein the application server process is a web server process.

20. The method of claim 18, wherein the analysis process is resident outside of the server.

21. The method of claim 18, further comprising analyzing the subset in the analysis process.

* * * * *